(12) United States Patent
Fuse et al.

(10) Patent No.: US 6,913,496 B2
(45) Date of Patent: Jul. 5, 2005

(54) PERSONAL WATERCRAFT

(75) Inventors: Tomohiro Fuse, Wako (JP); Masahiko Tsuchiya, Wako (JP); Takao Kochi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/660,205

(22) Filed: Sep. 10, 2003

(65) Prior Publication Data

US 2004/0127111 A1 Jul. 1, 2004

(30) Foreign Application Priority Data

Sep. 12, 2002 (JP) ........................................ 2002-266930

(51) Int. Cl.$^7$ ........................................... B63H 11/113
(52) U.S. Cl. .......................................... 440/41; 440/42
(58) Field of Search ............................. 440/38, 40, 41, 440/42

(56) References Cited

U.S. PATENT DOCUMENTS

| 3,589,325 | A | * | 6/1971 | Tattersall | 440/38 |
| 5,700,169 | A | * | 12/1997 | Jones | 440/46 |
| 6,062,922 | A | * | 5/2000 | Nanami | 440/38 |
| 2003/0003819 | A1 | * | 1/2003 | Adamczyk | 440/38 |

FOREIGN PATENT DOCUMENTS

JP          9-281132        10/1997

* cited by examiner

Primary Examiner—Stephen Avila
(74) Attorney, Agent, or Firm—Merchant & Gould P.C.

(57) ABSTRACT

A personal watercraft having an engine, a water jet propeller on the rear side of the engine, a jet nozzle for ejecting jet water, and a steering nozzle swingable in the left-right direction. The axis of the water jet propeller is set with a rearwardly downward gradient at an angle θ1, and the bottom surface of a ride plate is set with a rearwardly upward gradient at an angle θ2.

7 Claims, 14 Drawing Sheets

PERSONAL WATERCRAFT

BACKGROUND OF THE INVENTION

1. Field of the Invention

The present invention relates to a personal watercraft which navigates by the jet force of jet water through ejecting the jet water rearwards from a jet nozzle provided at a rear portion of a hull.

2. Description of the Related Art

Personal watercraft for navigating or planing on the waters of the sea and lakes are generally known. An example of such a personal watercraft is described in Japanese Patent Laid-open No. Hei 9-281132 and will be described below.

The personal watercraft includes an engine and a jet propeller driven by the engine which are disposed in a hull, and a steering nozzle provided at the rear end of the jet propeller. The jet propeller is driven by the engine, whereby an impeller of a water jet propeller is rotated, and water is sucked in through an intake port by the rotation of the impeller.

The water thus sucked in is ejected as jet water rearwards from the rear end of the steering nozzle. By the jet force of this jet water, the personal watercraft can plane in the condition where a front portion (bow) of the hull is floated up from the surface of water and can plane or navigate.

In order to efficiently eject the jet water from the rear end of the steering nozzle, it is preferable that the jet propeller is disposed close to the bottom of the hull. Meanwhile, as a driving engine for a personal watercraft, comparatively large engines are used in order to obtain the desired output. Therefore, the component around the crankshaft of the engine is large, and the crankshaft must be spaced upwards from the hull bottom.

Therefore, in order to dispose the jet propeller close to the hull bottom so as to efficiently eject the jet water, it is necessary to connect the components from the crankshaft to the jet propeller rectilinearly and to set the axis of the jet propeller rearwardly downwards.

On the other hand, the jet direction of the jet water ejected from the steering nozzle is desirably made to coincide with the axis of the jet propeller, in view of simplification of structure.

In addition, with the jet direction of the jet water ejected from the steering nozzle made to coincide with the axis of the jet propeller, it is possible to efficiently eject the jet water and to enhance the propulsion force.

However, in the above-mentioned personal watercraft, the jet direction of the jet water is rearwardly downwards, so that an upward lifting-up force is exerted on the stern. Therefore, when the sailing velocity is increased, the hull is put into a posture with its front portion lowered, causing the navigation resistance to be increased.

Of the conventional personal watercrafts, some have a structure in which the steering nozzle is disposed with a rearwardly upward gradient in order to reduce the navigation resistance. With the steering nozzle thus disposed with the rearwardly upward gradient, the stern of the hull can be lowered during navigation, and the hull can be maintained in a horizontal posture.

However, where the steering nozzle is disposed with the rearwardly upward gradient, the jet water from the jet propeller is deflected by the steering nozzle, so that the flow passage resistance is increased, resulting in a lowering of the propulsion force. In addition, where the steering nozzle is disposed with the rearwardly upward gradient, the constitution is complicated, and the number of component parts and the number of assembling steps are increased.

Accordingly, it is an object of the present invention to provide a personal watercraft in which the flow passage resistance is reduced, whereby jet water can be efficiently ejected, and a simpler constitution can be achieved.

SUMMARY OF THE INVENTION

According to one aspect of the present invention, there is provided a personal watercraft including an engine disposed on the lower side of a deck of a hull, a jet propeller disposed on the rear side of the engine, a jet nozzle for ejecting jet water rearwards which is disposed on the rear side of the jet propeller, and a steering nozzle supported on the jet nozzle so as to be movable in the left-right direction for determining the jet direction of the jet water ejected from the jet nozzle. The axis of the jet propeller is set with a rearwardly downward gradient. The jet direction of the jet water ejected from the steering nozzle coincides with the axis of the jet propeller. The bottom surface of the stern is set with a rearwardly upward gradient.

The axis of the jet propeller is set with the rearwardly downward gradient, and the jet direction of the jet water ejected from the steering nozzle is made to coincide with the axis of the jet propeller. Therefore, the flow passage resistance of the steering nozzle can be reduced, the jet water can be efficiently ejected, and the propulsion force can be enhanced.

In addition, with the bottom surface of the stern set with the rearwardly upward gradient, the volume of the bottom surface can be reduced as compared with an ordinary stern bottom surface, and the buoyancy can be reduced by an amount corresponding to the volume reduced. Therefore, the buoyancy on the stern can be reduced as compared with the buoyancy on the ordinary stern, resulting in that it is easier for the stern to sink underwater.

Therefore, when the jet force of the jet water is increased to put the personal watercraft into a planing condition, a force for lifting up the stern is generated because the jet direction of the jet water is downward, but, since the bottom surface of the stern is set with the rearwardly upward gradient, front and rear portions of the hull can be favorably floated up from the surface of water, and the personal watercraft can plane in a favorable posture.

In another aspect of the present invention, a personal watercraft including an engine disposed on the lower side of a deck of a hull, a jet propeller disposed on the rear side of the engine, a jet nozzle for ejecting jet water which is disposed on the rear side of the jet propeller, and a steering nozzle supported on the jet nozzle so as to be movable in the left-right direction for determining the jet direction of the jet water ejected from the jet nozzle. The axis of the jet propeller is set with a rearwardly downward gradient, the steering nozzle is vertically movable, the jet direction of the jet water ejected from the steering nozzle coincides with the axis of the jet propeller at a standard position during navigation, and the bottom surface of the stern is set with a rearwardly upward gradient.

With the steering nozzle thus vertically movable, the jet direction of the jet water can be appropriately adjusted in the vertical direction during planing of the personal watercraft, so that the hull can be maintained in a favorable planing posture. On the other hand, the jet direction of the jet water ejected from the steering nozzle is made to coincide with the axis of the jet propeller at the standard position during navigation. With the standard position made to be a position during navigation or planing of the personal watercraft, and with the steering nozzle set free at the time of navigation or planing, the steering nozzle is returned into the standard position by the force of the jet water ejected by the jet propeller, so that there is no need for a member for maintaining the steering nozzle in the standard position. By this, the structure for vertically swinging the steering nozzle can be simplified.

In another aspect of the present invention, there is provided a personal watercraft with jet propulsion means for propelling the watercraft forward, nozzle means for ejecting jet water from a rear side of the jet propulsion means, and steering means supported on the nozzle means so as to be movable in a left-right direction for determining a jet direction of jet water ejected from the jet nozzle. An axis of the jet propulsion means is set with a rearwardly downward gradient. The jet direction of jet water ejected from the steering means coincides with the axis of the jet propulsion means, and a bottom surface of a stern of the watercraft has a rearwardly upward gradient.

In another aspect of the present invention, there is provided a method of manufacturing a watercraft that comprises an engine, a jet propeller, a jet nozzle for ejecting jet water, and a steering nozzle. The method comprising the steps of providing a bottom surface of a stern of the watercraft with a rearwardly upward gradient, and fixing an axis of the jet propeller to coincide with an axis of the steering nozzle in a standard position during navigation of the watercraft. The standard position is set so that the coinciding axes have a rearwardly downward gradient.

DETAILED DESCRIPTION OF THE INVENTION

An embodiment of the present invention will be described below. Here, the terms "front", "rear", "left" and "right" have the respective meanings as viewed from the driver. The drawings are to be looked at according to the posture of symbols.

Figure 1:
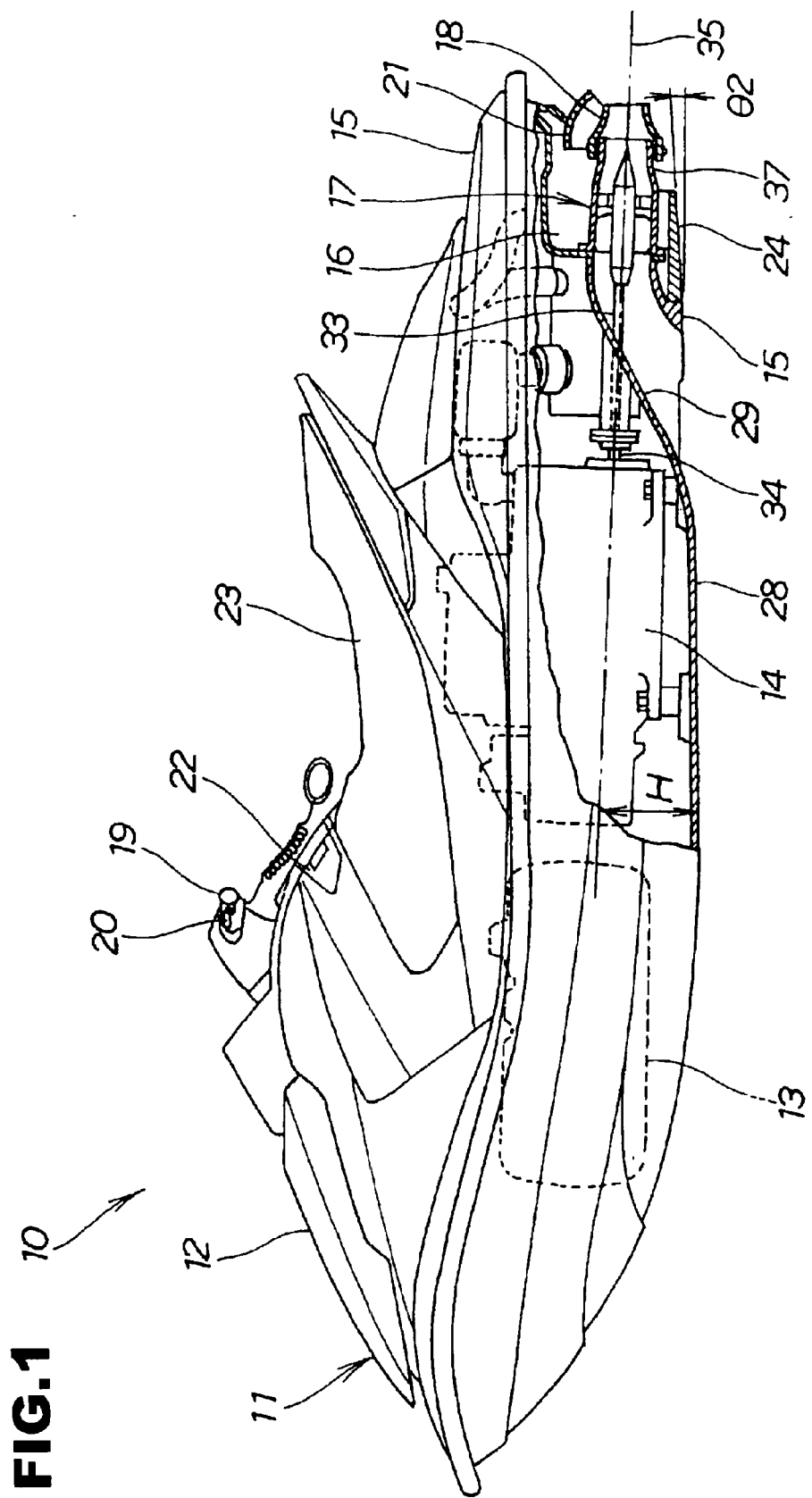
FIG. 1 is a side view of a personal watercraft according to the present invention.

FIG. 1 is a side view of a personal watercraft according to the present invention. The personal watercraft 10 has a structure in which a fuel tank 13 is provided at a front portion 12 of a hull 11, an engine 14 is provided on the rear side of the fuel tank 13, a jet propeller chamber 16 is provided at a stern 15 on the rear side of the engine 14, a water jet propeller (jet propeller) 17 is provided in the jet propeller chamber 16, a steering nozzle 18 is provided on the rear side of the water jet propeller 17, a steering handle 19 for swinging the steering nozzle 18 in the left-right direction is provided on the upper side of the fuel tank 13, a trim operating lever 20 for swinging the steering nozzle 18 vertically is provided on the steering handle 19, a reverse bucket 21 is provided on the rear side of the steering nozzle 18, a reverse operating lever 22 for swinging the reverse bucket 21 vertically is provided on the rear side of the steering handle 19, a seat 23 extending in the front-rear direction is provided on the rear side of the reverse operating lever 22, and a ride plate 24 is provided at a bottom surface of the stern 15 on the rear side of the seat 23.

Figure 2:
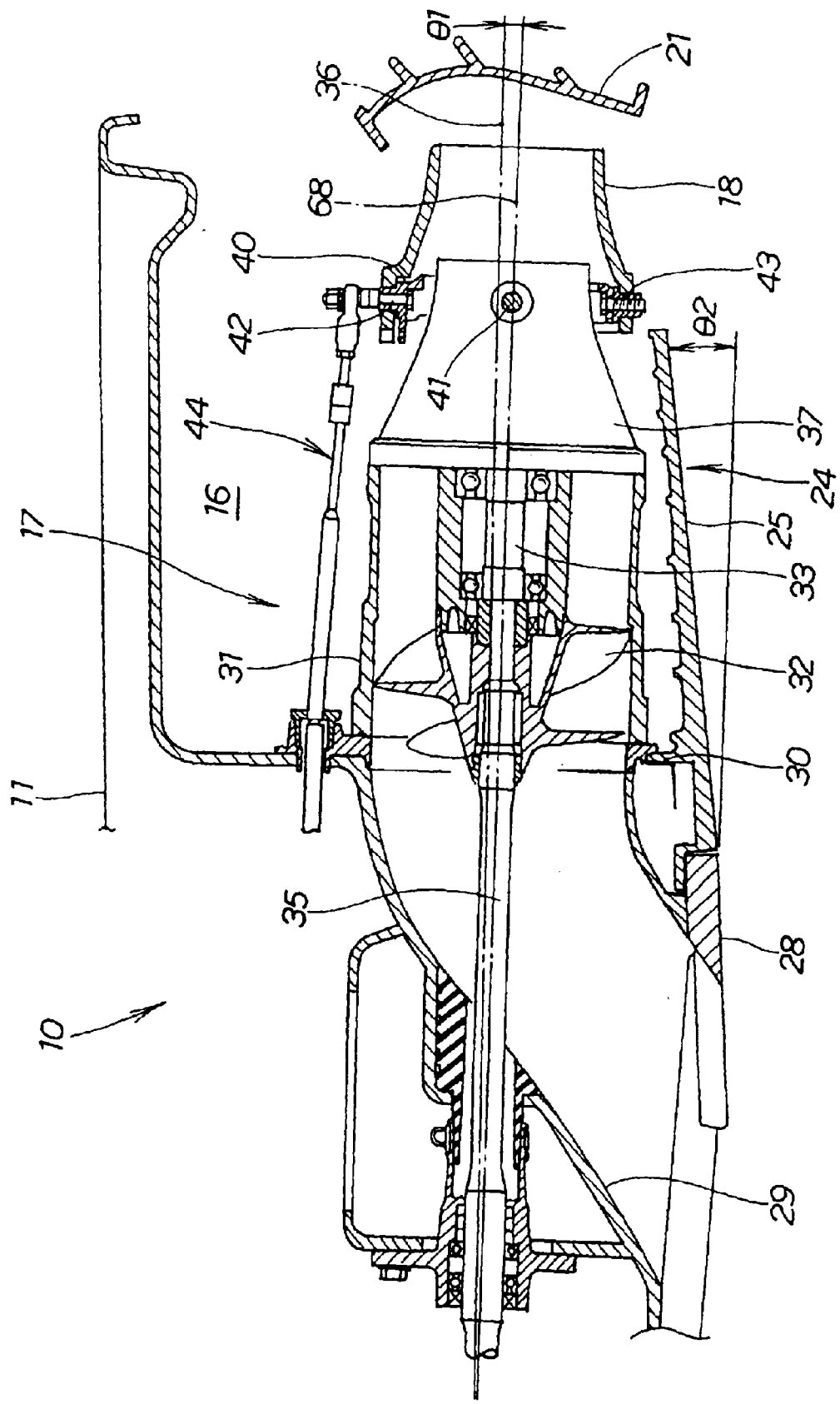
FIG. 2 is a sectional view of an essential part of the personal watercraft according to the present invention.

FIG. 2 is a sectional view of a part of the personal watercraft according to the present invention, and shows the condition where the reverse bucket 21 is disposed at a position on the rear side of the steering nozzle 18, namely, at a reverse position.

The water jet propeller 17 has a structure in which an intake port 29 is provided in a hull bottom 28 of the hull 11, the intake port 29 is extended to the water jet propeller chamber 16, a cylindrical stator 31 is provided in a wall portion 30 of the jet propeller chamber 16, an impeller 32 is rotatably disposed in the stator 31, and a drive shaft 34 (see FIG. 1) is connected to a shaft 33 of the impeller 32.

The water jet propeller 17 has its axis 35 (axis of jet nozzle) set with a downward gradient at an angle $\theta 1$ (see FIG. 1 also) toward the rear side of the hull 11 relative to a reference line 36 parallel to the horizontal line during planing. The drive shaft 34 is a shaft for outputting the driving power of the engine 14, with its front end connected to the engine 14.

According to the personal watercraft 10, the impeller 32 can be rotated by rotating the drive shaft 34 by the engine 14 shown in FIG. 1. Since the impeller 32 can be rotated, water can be taken in through the intake port 29 and led into the stator 31. The water thus led in is passed through the rear end of the stator 31 and through the steering nozzle 18, to be jetted rearwards as water jet, whereby the personal watercraft 10 can be made to plane.

Here, the reason for setting the axis 35 of the water jet propeller 17 with the downward gradient at the inclination angle of θ1 toward the rear side of the hull 11 relative to the reference line 36 parallel to the horizontal line during planing will be described, referring back to FIG. 1.

It is necessary for the water jet propeller 17 to efficiently take in the water taken in through the intake port 29 and to efficiently jet the taken-in water as jet water. Therefore, it is preferable that the jet nozzle 37 at a rear portion of the water jet propeller 17 and the steering nozzle 18 mounted onto the jet nozzle 37 are disposed at positions close to the hull bottom 28, namely, at lower positions in the hull 11.

On the other hand, it is necessary for the engine 14 to be large enough to provide the output necessary for driving the water jet propeller 17. Therefore, a crankshaft of the engine 14 (namely, the drive shaft 34 of the engine 14) is disposed at a somewhat high position H from the hull bottom 28.

In view of this, in order to rectilinearly connect the drive shaft 34 at the high position and the axis of the water jet propeller 17 at the low position, the drive shaft 34 and the axis 35 of the water jet propeller 17 have been set with a downward gradient at the angle θ1 toward the rear side of the hull 11 relative to the reference line 36 parallel to the horizontal line during planing.

Here, by constituting the steering nozzle 18 to be swingable (movable) vertically, the axis 68 of the steering nozzle 18 can be made to coincide with the axis 35 of the water jet propeller 17. By this, jet water can be jetted downwards from the steering nozzle 18.

Furthermore, when jet water is jetted from the water jet propeller 17 with the steering nozzle 18 set free relative to the jet nozzle 37 of the water jet propeller 17, the jet force of the jet water returns the steering nozzle 37 to be coaxial with the axis 35 of the water jet propeller 17.

Therefore, with the axis 35 of the water jet propeller 17 set with the rearwardly downward gradient and with the jet direction of the jet water ejected from the steering nozzle 18 set to coincide with the axis 35 of the water jet propeller 17, the need for a member to maintain the steering nozzle 18 such that it coincides with the axis 35 of the water jet propeller 17 can be eliminated. By this, the structure for vertically swinging the steering nozzle 18 can be simplified.

In addition, the jet direction of the jet water ejected from the steering nozzle 18 has been set to coincide with the axis 35 of the water jet propeller 17 at a standard position during navigation. Therefore, the need for a member for holding the steering nozzle 18 in the standard position during navigation or planing can be eliminated. By this, the structure for vertically swinging the steering nozzle 18 can be simplified.

The merits of ejecting the jet water downwards from the steering nozzle 18 will be described in detail later, referring to FIG. 14(a).

Figure 4:
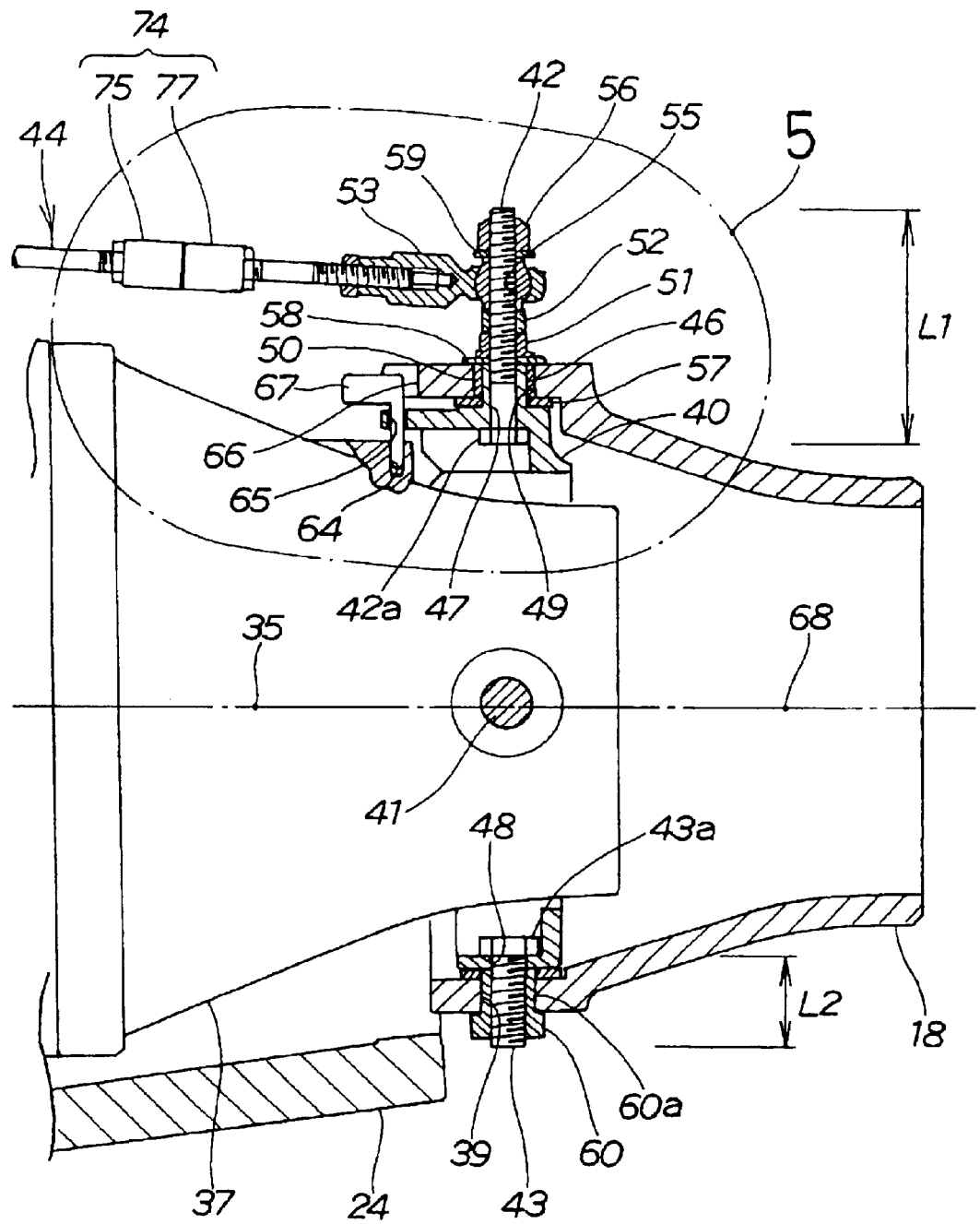
FIG. 4 is an enlarged sectional view of a steering nozzle of the personal watercraft according to the present invention.

Returning to FIG. 2, the water jet propeller 17 has a structure in which a trim ring 40 is mounted onto the jet nozzle 37 at the rear end of the stator 31 with left and right support shafts (bolts) 41, 41 (the right-side one is shown in FIG. 4) so as to be vertically swingable, and the steering nozzle 18 is mounted onto the trim ring 40 with upper and lower support shafts (bolts) 42, 43 so as to be swingable (movable) in the left-right direction.

A trim operating cable (operating cable) 44 is connected to the steering nozzle 18 through the upper bolt 42, and the trim operating cable 44 is connected to a trim operating lever 20 (see FIG. 4) of the steering handle 19. With this arrangement, the steering nozzle 18 can be vertically swung with the left and right bolts 41, 41 as a center, by operating the trim operating cable 44 with the trim operating lever 20.

Thus, by vertically swinging the steering nozzle 18 with the left and right bolts 41, 41 as a center, the planing posture of the hull 11 during planing of the personal watercraft 10 can be maintained favorably.

In addition, the personal watercraft 10 has a structure in which, of the bottom surface of the stern 15, the portion on the lower side of the water jet propeller 17 is constituted of the ride plate 24 which can be detached from the hull 11. The ride plate 24 is fixed to the hull 11 with bolts (not shown). The bottom surface (the bottom surface of the stern) 25 of the ride plate 24 is set with an upward gradient at an angle θ2 toward the rear side of the hull 11 relative to the reference line 36 parallel to the horizontal line during planing.

The merits of setting the bottom surface 25 of the ride plate 24 with the upward gradient at the angle θ2 toward the rear side of the hull 11 relative to the reference line 36 parallel to the horizontal line during planing will be described in detail later, referring to FIG. 14(b).

Figure 3:
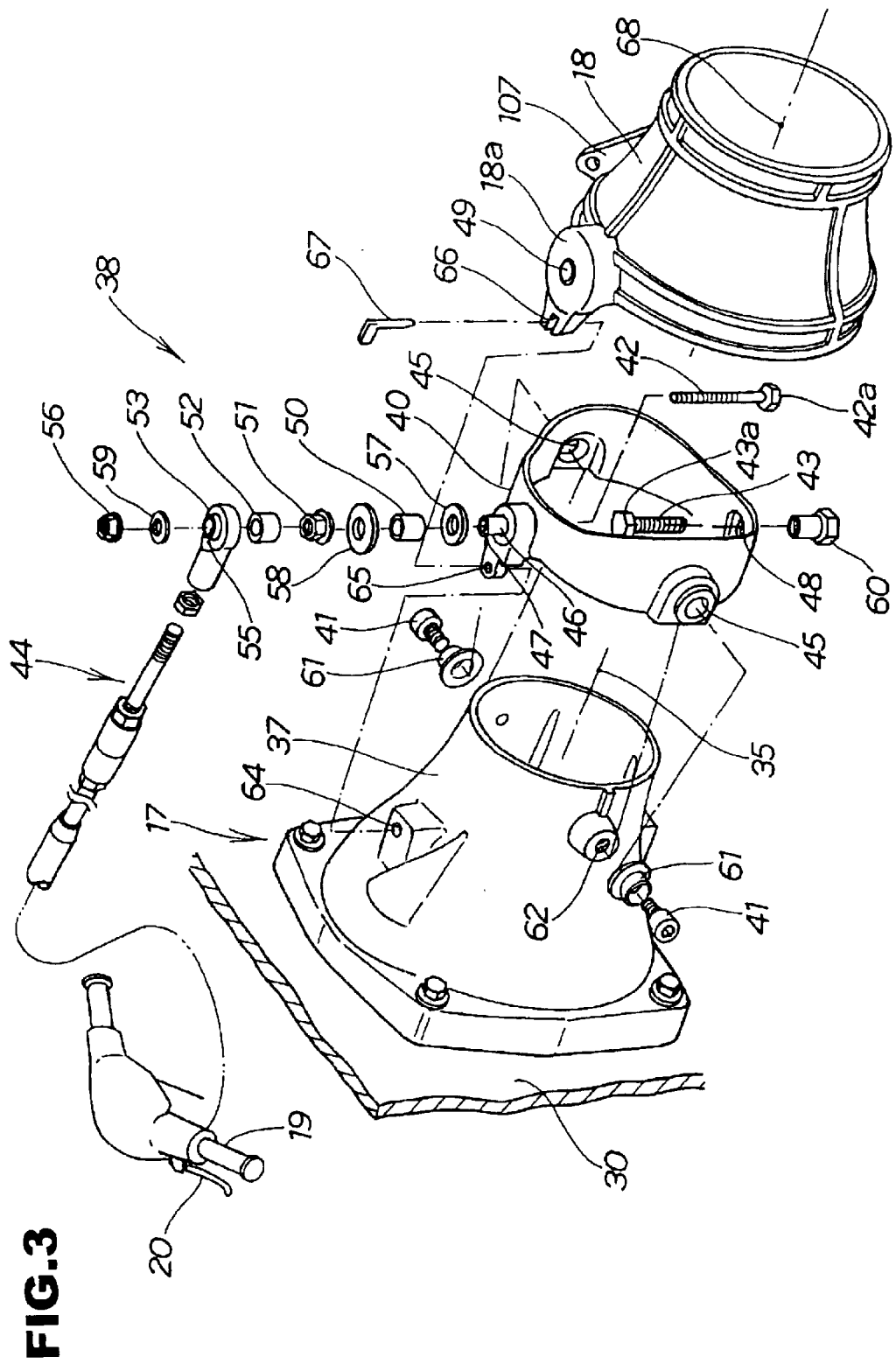
FIG. 3 is an exploded perspective view of the steering nozzle mount structure of a personal watercraft according to the present invention.

FIG. 3 is an exploded perspective view of another part of the personal watercraft according to the present invention, namely the steering nozzle mount structure. A steering nozzle mount structure 38 constituting the personal watercraft 10 has a structure in which the trim ring 40 is mounted onto a rear portion of the jet nozzle 37 with the left and right support shafts (bolts) 41, 41 so as to be vertically swingable about the left and right bolts 41, 41, and the steering nozzle 18 is mounted onto the trim ring 40 with the upper and lower support shafts (bolts) 42 and 43 so as to be swingable about the upper and lower bolts 42 and 43, whereby the steering nozzle 18 is mounted onto the jet nozzle 37 so as to be swingable vertically and in the left-right direction.

The trim ring 40 is an annular member. Left and right side mount holes 45, 45 are provided in left and right side portions of the trim ring 40. A shaft portion 46 is provided at an upper portion of the trim ring 40. The shaft portion 46 is provided with an upper mount hole 47 penetrating therethrough, and a lower mount hole 48 is provided in a lower portion of the trim ring 40.

The shaft portion 46 at the upper portion of the trim ring 40 is inserted into an upper mount hole 49 in the steering nozzle 18, and a collar 50 is inserted into the space between the upper mount hole 49 and the shaft portion 46. The upper bolt 42 is inserted into the upper mount hole 47 from the inside of the trim ring 40, a nut 51 is fastened to the upper bolt 42 protruding from an upper portion of the steering nozzle 37, and a spacer 52 is fitted over the upper bolt 42 protruding from the nut 51.

A mount hole 55 in a trim joint (connection portion) 53 is fitted over the upper bolt 42 protruding from the spacer 52, and a nut 56 is screw-engaged with the upper bolt 42 protruding from the trim joint 53.

A washer 57 is disposed between the trim ring 40 and the steering nozzle 18, and a washer 58 is disposed between the upper end 18a of the steering nozzle 18 and the nut 51. Further, a washer 59 is disposed between the trim joint 53 and the nut 56.

In addition, the lower bolt 43 is inserted into the lower mount hole 48 in the trim ring 40 and the lower mount hole 39 (see FIG. 4) in the steering nozzle 18 from the inside, and a nut 60 is screw-engaged with the lower bolt 43 from the outside of the steering nozzle 18. Therefore, the steering nozzle 18 can be mounted onto the trim ring 40 so as to be swingable in the left-right direction, with the upper and lower bolts 42 and 43 as an axis.

Left and right collars 61, 61 are fitted into the left and right side mount holes 45, 45 in the trim ring 40, the left and right bolts 41, 41 are inserted into the left and right collars 61, 61, and the tip ends of the bolts 41, 41 are screw-engaged with left and right threaded holes 62 (the threaded hole on the right side is not shown) in the jet nozzle 37. Therefore, the trim ring 40 can be mounted onto the jet nozzle 37 so as to be swingable vertically, with the left and right bolts 41, 41 as an axis.

Thus, the trim ring 40 is mounted onto the jet nozzle 37 so as to be vertically swingable, and the steering nozzle 18 is mounted onto the trim ring 40 so as to be swingable in the left-right direction, whereby the steering nozzle 18 can be mounted to be swingable vertically and in the left-right direction relative to the jet nozzle 37.

Here, the trim operating cable 44 is connected to the trim joint 53, and the trim operating cable 44 is connected to the trim operating lever 20 on the steering handle 19, whereby the steering nozzle 18 can be swung vertically with the left and right bolts 41, 41 as a center by operating the trim operating cable 44 by use of the trim operating lever 20.

In addition, the jet nozzle 37 is provided with a recessed portion for positioning (hereinafter referred to as "positioning recessed portion") 64, the trim ring 40 is provided with a through-hole 65 for positioning (hereinafter referred to as "positioning hole"), and the upper end of the steering nozzle 18 is provided with an insertion groove 66.

A positioning pin 67 is inserted through the insertion groove 66 into the positioning hole 65, and the tip end of the positioning pin 67 protruding from the positioning hole 65 is inserted into the positioning recessed portion 64, whereby the axis 68 of the steering nozzle 18 can be made to coincide with the axis of the jet nozzle 37, namely, the axis 35 of the jet propeller 17.

FIG. 4 is an enlarged sectional view of a steering nozzle of the personal watercraft according to the present invention. The shaft portion 46 at the upper portion of the trim ring 40 is inserted into the upper mount hole 49 at the upper portion of the steering nozzle 18, the collar 50 is inserted into the space between the upper mount hole 49 and the shaft portion 46, the upper bolt 42 is inserted into the upper mount hole 47 in the trim ring 40 from the inside of the trim ring 40, and the nut 51 is screw-engaged with the upper bolt 42 protruding from the upper portion of the steering nozzle 18, whereby the upper bolt 42 is attached to the trim ring 40 and the steering nozzle 18.

After the upper bolt 42 is attached to the trim ring 40 and the steering nozzle 18, the spacer 52 is fitted over the upper bolt 42 protruding from the nut 51. The mount hole 55 in the trim joint 53 is fitted over the upper bolt 42 protruding from the spacer 52, and the nut 56 is screw-engaged with the upper bolt 42 protruding from the trim joint 52. By this, the head (hereinafter referred to as "upper bolt head") 42a of the upper bolt 42 can be disposed to be directed toward the jet nozzle 37.

In addition, the length (upper bolt length) L1 of the upper bolt 42 is so set that, if the upper bolt 42 is slackened and the upper bolt head 42a comes into contact with the jet nozzle 37, the upper bolt 42 is prevented from being disengaged from the steering nozzle 18, i.e., the upper bolt 42 remains fastened to the steering nozzle 18. Therefore, even if the upper bolt 42 should be slackened, the upper bolt 42 can be prevented from slipping out of the upper mount hole 47, and the upper bolt 42 can be prevented from dropping.

In addition, the lower bolt 43 is inserted into the lower mount hole 48 in the trim ring 40 and the lower mount hole 39 in the steering nozzle 18 from the inside, and the nut 60 is screw-engaged with the lower bolt 43 from the outside of the steering nozzle 18. A shaft portion 60a of the nut 60 can be inserted into the lower mount hole 39 in the steering nozzle 18.

With the lower bolt 43 inserted from the inside of the trim ring 40, the head (hereinafter referred to as "lower bolt head") 43a of the lower bolt 43 can be disposed to be directed toward the jet nozzle 37.

In addition, the length (lower bolt length) L2 of the lower bolt 43 is so set that, if the lower bolt 43 is slackened and the lower bolt head 43a comes into contact with the jet nozzle 37, the lower bolt 43 is prevented from being disengaged from the steering nozzle 18, i.e., the lower bolt 43 remains fastened to the steering nozzle 18. Therefore, even if the lower bolt 43 should be slackened, the lower bolt 43 can be prevented from dropping.

Also, since the lower bolt head 43a is located on the upper side, the lower bolt 43 can be prevented from dropping, even if the length (lower bolt length) L2 of the lower bolt 43 is not set so that, if the lower bolt 43 is slackened and the lower bolt head 43a comes into contact with the jet nozzle 37, the lower bolt 43 is prevented from being disengaged from the steering nozzle 18, i.e., the lower bolt 43 remains fastened to the steering nozzle 18.

In addition, at the time of mounting the trim ring 40 and the steering nozzle 18 onto the jet nozzle 37, particularly at the time of adjusting the length of the trim operating cable 44, the positioning pin 67 is inserted through the insertion groove 66 into the positioning hole 65, and the tip end of the positioning pin 67 protruding from the positioning hole 65 is inserted into the positioning recessed portion 64.

By this, the axis 68 of the steering nozzle 18 can be made to coincide with the axis of the jet nozzle 37, namely, the axis 35 of the water jet propeller 17. Therefore, the direction of the steering nozzle 18 can be fixed in a standard position.

In this condition, the length of the trim operating cable 44 is adjusted, and after the adjustment of the length of the trim operating cable 44 is completed, the positioning pin 67 is drawn out of the positioning hole 65 and the positioning recessed portion 64.

Figure 5:
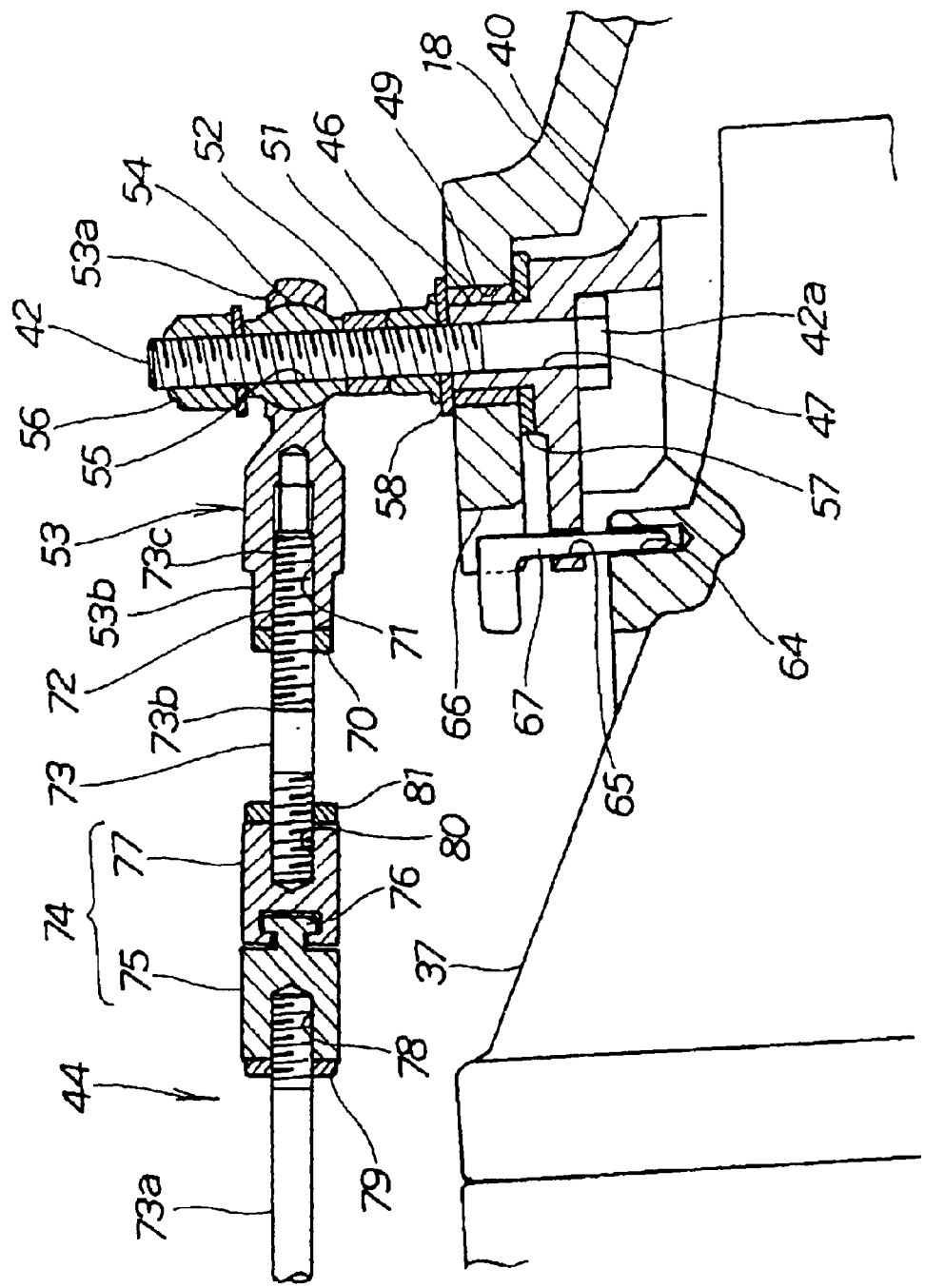
FIG. 5 is an enlarged view of part 5 of FIG. 4.

FIG. 5 is an enlarged view of part 5 of FIG. 4. The upper bolt 42 is inserted into the upper mount hole 47 from the inside of the trim ring 40, the washer 58 is fitted over the upper bolt 42 protruding from the upper portion of the steering nozzle 18, and the nut 51 is fastened from the upper side of the washer 58, whereby the upper bolt 42 can be fixed to the trim ring 40 and the steering nozzle 18.

The trim joint 53 attached to the upper bolt 42 includes a ball 54 in a turnable state at a head portion 53a thereof, and the ball 54 can be mounted onto the upper bolt 42 by fitting a mount hole 55 in the ball 54 over the upper bolt 42. By this, a neck portion 53b can be swung in any direction relative to the ball 54.

A screw portion formed at the rear end 72 of the trim operating cable 44 is screw-engaged into a threaded hole 71 formed in the neck portion 53b. Namely, the trim operating cable 44 includes a rod portion 73 at a rear end portion thereof, the screw portion formed at the rear end 72 of the rod portion 73 is screw-engaged into the threaded hole 71 in the neck portion 53b, and the screw portion is fastened with a lock nut 70. By this, the upper bolt 42 can be connected to the trim operating cable 44. Thus, by connecting the trim operating cable 44 by utilizing the upper bolt 42, the structure can be simplified.

A joint means 74 is provided at an intermediate portion of the rod portion 73, whereby the rod portion 73 is divided into a front rod 73a and a rear rod 73b. The joint means 74 includes a front joint portion 75 which is provided with a flange 76 at the rear end thereof via a projection, and a rear joint portion 77 rotatably connected to the flange 76.

A rear-end screw of the front rod 73a is screw-engaged into a threaded hole 78 formed in the front joint portion 75 and is fastened with a lock nut 79, whereas a front-end screw of the rear rod 73b is screw-engaged into a threaded hole 80 formed in the rear joint portion 77 and is fastened with a lock nut 81. By this, the front and rear rods 73a and 73b can be connected to each other through the joint means 74.

Thus, the upper bolt 42 is fixed to the trim ring 40 and the steering nozzle 18, and the trim joint 53 is connected to the upper bolt 42. Therefore, at the time of readjusting the length of the trim operating cable 44 after once fitting the trim joint 53 onto the upper bolt 42, the trim joint 53 is drawn out from the upper bolt 42, the lock nut 70 is slackened, and the connection length of the connection between a screw portion 73c of the front rod 73a constituting the rod 73 and the threaded hole 71 in the neck portion 53b is adjusted. By this, the length of the so-called trim operating cable 44 can be adjusted.

With the trim joint 53 thus capable of being fitted over and drawn out from the upper bolt 42 erected on the trim ring 40, the trim operating cable 44 can be tentatively fastened to the upper bolt 42 by simply fitting the trim joint 53 over the upper bolt 42. By this, in the tentative fastened condition in which the trim joint 53 is simply fitted over the upper bolt 42, it is possible to check whether or not the length of the trim operating cable 44 is normal.

Therefore, where it is necessary to readjust the length of the trim operating cable 44, it is possible to easily disengage the trim joint 53 from the upper bolt 42. Accordingly, the length of the trim operating cable 44 can be easily readjusted by drawing out the trim joint 53 from the upper bolt 42.

In addition, by intermediately providing the joint means 74 at an intermediate portion of the rod portion 73, the trim joint 53 can be rotated arbitrarily. Therefore, when the length of the trim operating cable 44 is adjusted by slackening the lock nut 70 of the trim joint 53 and rotating the trim joint 53 so as to change the protrusion amount of the trim joint 53, for example, the mount hole 55 in the ball 54 of the trim joint 53 may come out of registration with the axis of the upper bolt 42.

In this case, the mount hole 55 in the ball 54 can be brought into registration with the axis of the upper bolt 42 by rotating the rear joint portion 77 of the joint means 74.

Figure 6:
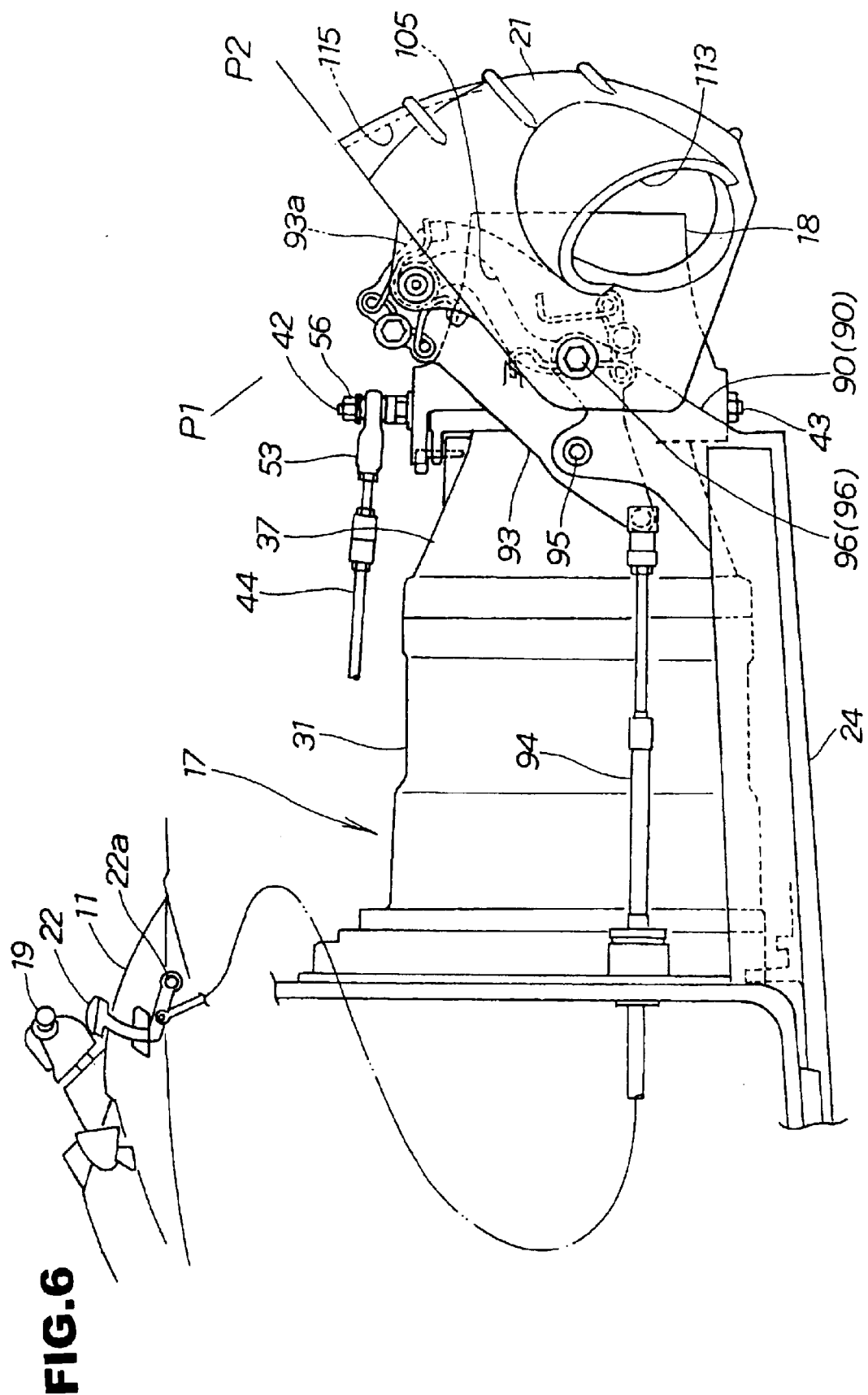
FIG. 6 is a side view showing a reverse bucket and related components of a personal watercraft according to the present invention.

Next, the reverse bucket 21 (see FIGS. 1 and 2) will be described. FIG. 6 is a side view showing a reverse bucket and related components of a personal watercraft according to the present invention.

Left and right support brackets 90 and 91 (for the right support bracket, see also FIG. 7) are provided respectively on the left and right sides of the ride plate 24, and the reverse bucket 21 is mounted onto the left and right support brackets 90 and 91 so as to be vertically swingable.

An intermediate lever 93 is disposed in a gap 92 (see FIG. 7) between the left support bracket 90 and the steering nozzle 18, and the intermediate lever 93 is swingably mounted onto the left support bracket 90. A reverse operating cable 94 is connected to the reverse bucket 21 through the intermediate lever 93, and the reverse cable 94 is attached to the reverse operating lever 22.

By vertically swinging the reverse operating lever 22 with a support shaft 22a as a center, the reverse operating cable 94 is operated to thereby swing the intermediate lever 93 with a support bolt 95 as an axis. With the intermediate lever 93 swung, the reverse bucket 21 can be vertically swung, with left and right support bolts 96, 96 (for the right support bolt, see also FIG. 7) as an axis.

By this, the reverse bucket 21 can be moved to a forward position P1 on the upper side of the steering nozzle 18 and a reverse position P2 (the position shown) on the rear side of the steering nozzle 18.

Figure 7:
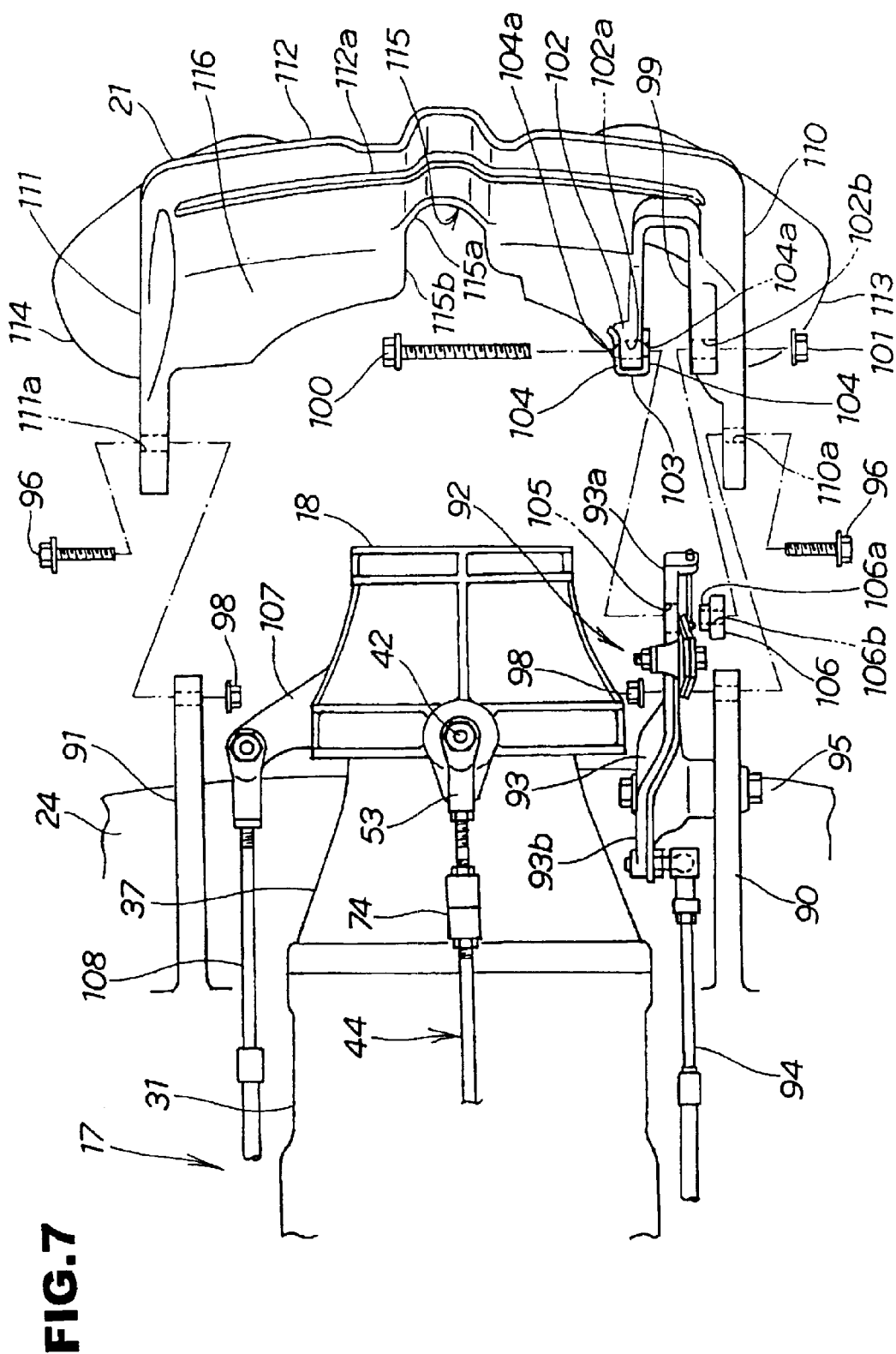
FIG. 7 is a plan view showing the reverse bucket and related components of the personal watercraft according to the present invention.

FIG. 7 is a plan view showing the reverse bucket and related components of the personal watercraft according to the present invention. The left and right support brackets 90 and 91 are provided on the left and right sides of the ride plate 24, namely, on the left and right sides of the steering nozzle 18. The reverse bucket 21 is vertically swingably mounted onto the left and right support brackets 90 and 91 with the left and right support bolts 96, 96 and nuts 98, 98. A containing pocket 99 is formed at a left end portion of the reverse bucket 21, an upper end portion 93a of the intermediate lever 93 is inserted into the containing pocket 99, and the intermediate lever 93 thus inserted is mounted onto the reverse bucket 21 with a mount bolt 100 and a nut 101.

Here, at the time of mounting the upper end portion 93a of the intermediate lever 93 onto the containing pocket 99 of the reverse bucket 21 with the mount bolt 100 and the nut 101, a washer clip 103 (see FIG. 8 also) is fitted over a boss 102 of the containing pocket 99. The washer clip 103 is roughly U-shaped, and its two pieces 104, 104 opposed to each other are provided with through-holes 104a, 104a.

The washer clip 103 is fitted over the boss 102 of the reverse bucket 21, and the through-holes 104a, 104a in the washer clip 103 are put into registration with a mount hole 102a in the boss 102.

A projection 106a on a slide member 106 is slidably fitted into a guide groove 106 (see FIG. 6 also) in he intermediate lever 93. A mount hole 106a in the slide member 106 is put into registration with mount holes 102a and 102b in the containing pocket 99.

A mount bolt 100 is inserted into the mount holes 102a, 106a and 102b, and a nut 101 is screw-engaged with a tip portion of the mount bolt 100. The intermediate lever 93 can be mounted to the mount holes 102a and 102b in the containing pocket 99 with the mount bolt 100.

Thus, with the washer clip 103 fitted over the boss 102 of the reverse bucket 21, the conventional operation of holding a washer by hand at the time of assembly can be eliminated. Therefore, simplification of the assembling operation can be achieved, and the intermediate lever 93 can be easily assembled in a short time.

After the intermediate lever 93 is thus disposed between the left support bracket 90 and the steering nozzle 18, the intermediate lever 93 is swingably mounted onto the left support bracket 90 with the support bolt 95. Then, the reverse operating cable 94 is connected to a lower end portion 93b of the intermediate lever 93, whereby the reverse cable 94 is disposed along a left side wall of the stator 31.

By operating the reverse operating cable 94 with the reverse operating lever 22 (see FIG. 6), the reverse bucket 21 can be vertically swung, with the left and right support bolts 96, 96 as an axis.

The reverse bucket 21 has a structure in which a curved rear wall 112 is bridgingly connected to left and right side walls 110 and 111. The left and right side walls 110 and 111 are provided respectively with left and right jet ports 113 and 114. The left and right side walls 110 and 111 are provided with mount holes 110a and 111a for mounting onto the left and right support brackets 90 and 91, and the containing pocket 99 is provided with the mount holes 102a and 102b for mounting of the intermediate lever 93.

Here, the personal watercraft 10 (see FIG. 1) has a structure in which, for vertically swinging the steering nozzle 18 with the left and right bolts 41, 41 (see FIG. 3) as an axis, the upper bolt 42 is attached to an upper end portion of the steering nozzle 18, and the trim operating cable 44 is attached to the upper bolt 42 through the trim joint 53 and disposed along an upper portion of the stator 31.

A roughly central portion of the reverse bucket 21 is located on the rear side of these members, namely, the upper bolt 42, the trim joint 53 and the trim operating cable 44. Therefore, at the time of raising the reverse bucket 21 to the forward position P1 (see FIG. 6), a central portion of the rear wall 112 of the reverse bucket 21 may interfere with these members (the upper bolt 42, the trim joint 53 and the trim operating cable 44).

Taking this into account, a connection portion containing recessed portion 115 for avoiding the interference with these members (the upper bolt 42, the trim joint 53 and the trim operating cable 44) is provided in a center portion 112a of the rear wall 112 of the reverse bucket 21.

The connection portion containing recessed portion (recessed portion) 115 includes a roughly curved containing groove 115a gradually projecting rearwards from the rear wall 112, specifically from the central portion 112a toward the upper end 112b of the rear wall 112, and a cutout 115b formed at the center of a bent portion 116 of the rear wall 112, namely, at a position corresponding to the containing groove 115a.

An arm 107 is extended outwards from the right side wall of the steering nozzle 18, and a steering operating cable 108 is disposed on the arm 107 and along the right side wall of the stator 31. By operating the steering operating cable 108 with the steering handle 19 (see FIG. 1), the steering nozzle 18 can be swung in the left-right direction with the upper and lower bolts 42 and 43 (for the lower bolt 43, see FIG. 4) as an axis.

Figure 8:
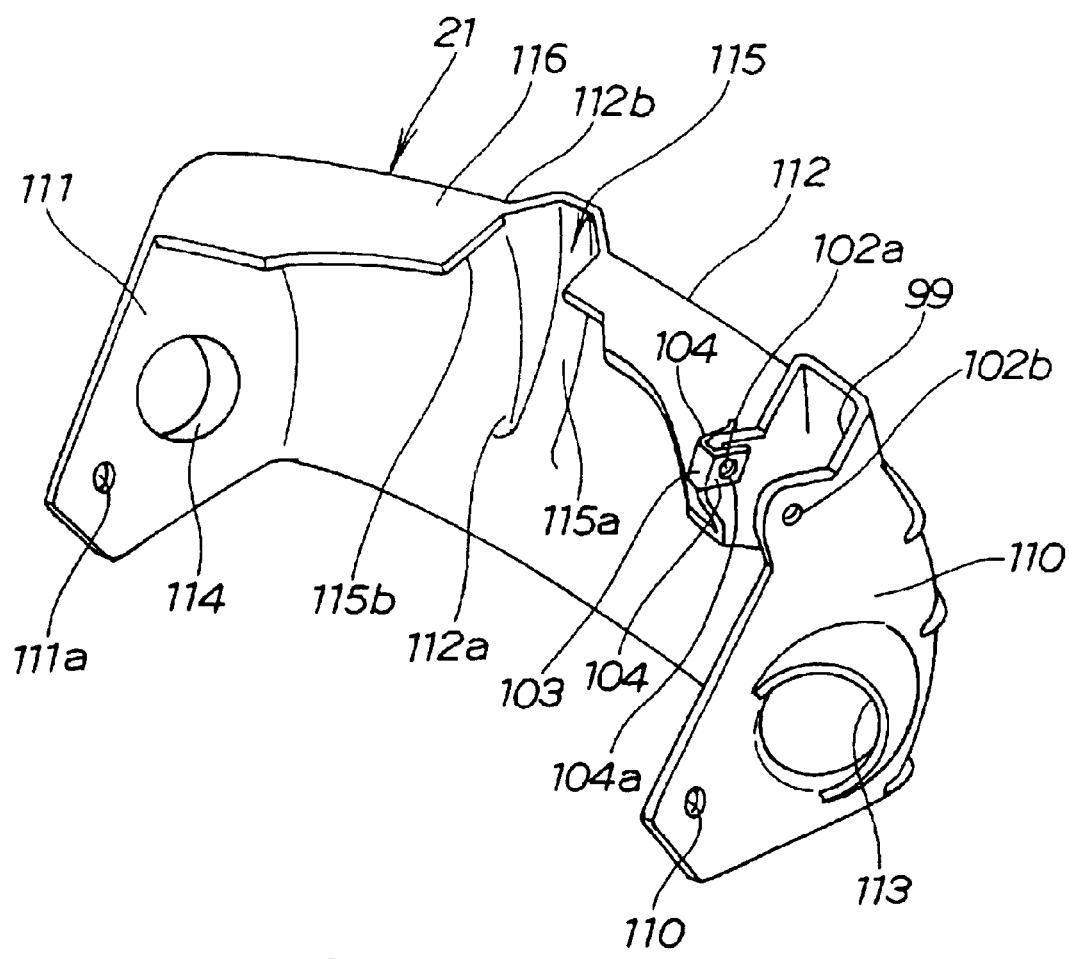
FIG. 8 is a perspective view of a reverse bucket of the personal watercraft according to the present invention.

FIG. 8 is a perspective view of the reverse bucket of the personal watercraft according to the present invention. Referring to this figure, the connection portion containing recessed portion 115 will be described in detail.

The connection portion containing recessed portion 115 includes the containing groove 115a formed in the rear wall 112, and the cutout 115b formed at the upper end of the containing groove 115a to thereby open the upper end of the containing groove 115a.

The containing groove 115a is a groove extended roughly vertically so as to have a gradually increasing groove depth, from the center in the left-right direction of the rear wall 112 and the rough center 112a in the vertical direction of the rear wall 112 toward the upper end 112b of the rear wall 112.

In addition, the cutout 115b is formed at the center of the bent portion 116 formed at the upper end of the rear wall 112, i.e., the cutout 115b is formed at a position corresponding to the containing groove 115a. With the cutout 115b thus formed at the center of the bent portion 116, the upper end of the containing groove 115a is open.

Next, the process of assembling the steering nozzle of the personal watercraft will be described based on FIGS. 9 to 12.

Figure 9A:
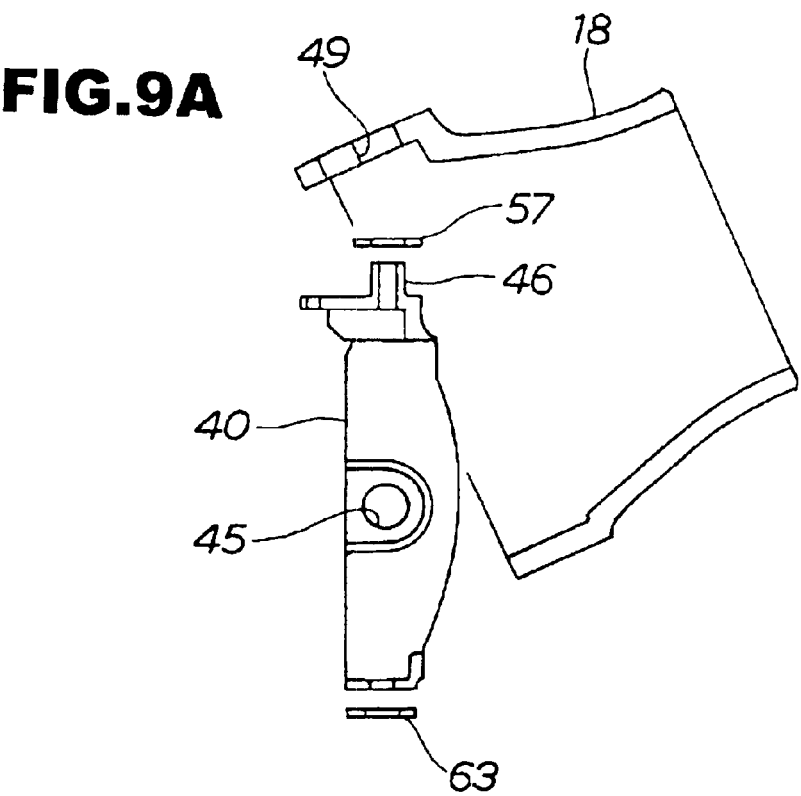
FIGS. 9(a) and 9(b) are assembly step views for illustrating the process of assembling a steering nozzle onto a jet nozzle, in the personal watercraft according to the present invention.

FIGS. 9(a) and (b) are first assembly step views for illustrating the process of assembling the steering nozzle onto the jet nozzle, in the personal watercraft according to the present invention.

As shown in FIG. 9(a), the washer 57 is fitted over the shaft portion 46 at the upper end of the trim ring 40, and a washer 63 is set at the lower end of the trim ring 40. In this condition, the shaft portion 46 of the trim ring 40 is inserted into the upper mount hole 49 in the steering nozzle 18.

Figure 9B:
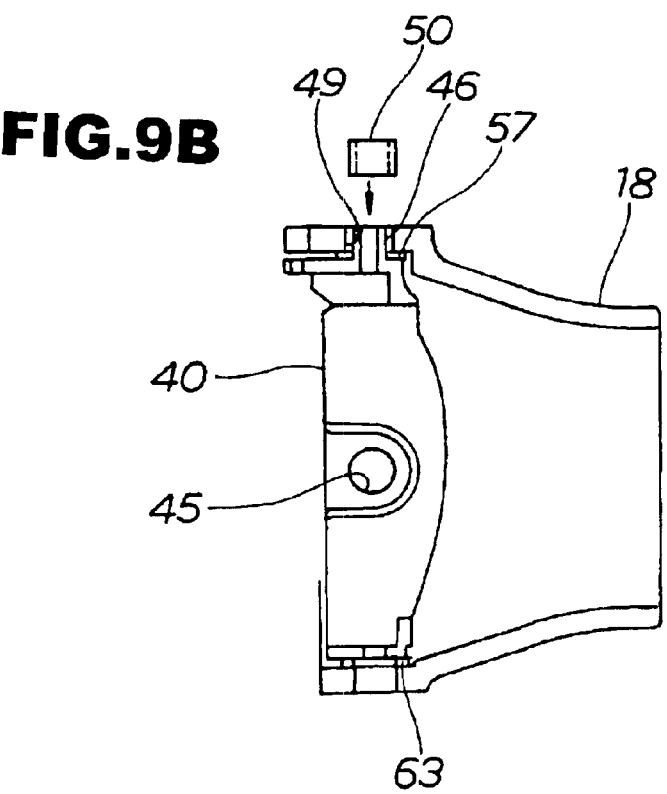

As shown in FIG. 9(b), the shaft portion 46 of the trim ring 40 is inserted into the upper mount hole 49 in the steering nozzle 18. Next, the collar 50 is inserted into the gap between the shaft portion 46 of the trim ring 40 and the steering nozzle 18. By this, the trim ring 40 can be contained in the front end of the steering nozzle 18.

Figure 10A:
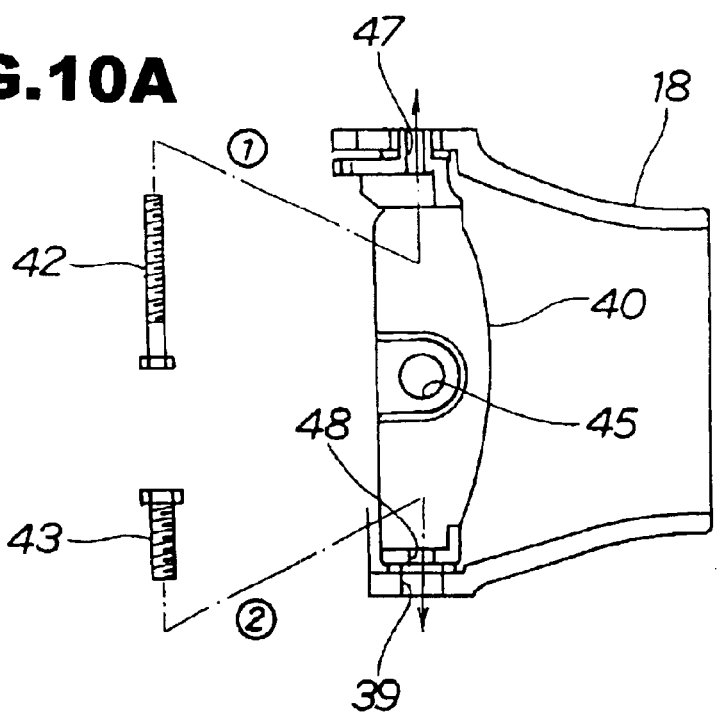
FIGS. 10(a) and 10(b) are additional assembly step views for illustrating the process of assembling the steering nozzle onto the jet nozzle, in the personal watercraft according to the present invention.

FIGS. 10(a) and (b) are second assembly step views for illustrating the process of assembling the steering nozzle onto the jet nozzle, in the personal watercraft according to the present invention.

As shown in FIG. 10(a), the upper bolt 42 is inserted into the upper mount hole 47 at the upper end of the trim ring 40 from the inside of the trim ring as indicated by arrow (1). Next, the lower bolt 43 is inserted into the lower mount hole 48 at the lower end of the trim ring and the lower mount hole 39 at a lower portion of the steering nozzle 18 from the inside of the trim ring as indicated by arrow (2).

Figure 10B:
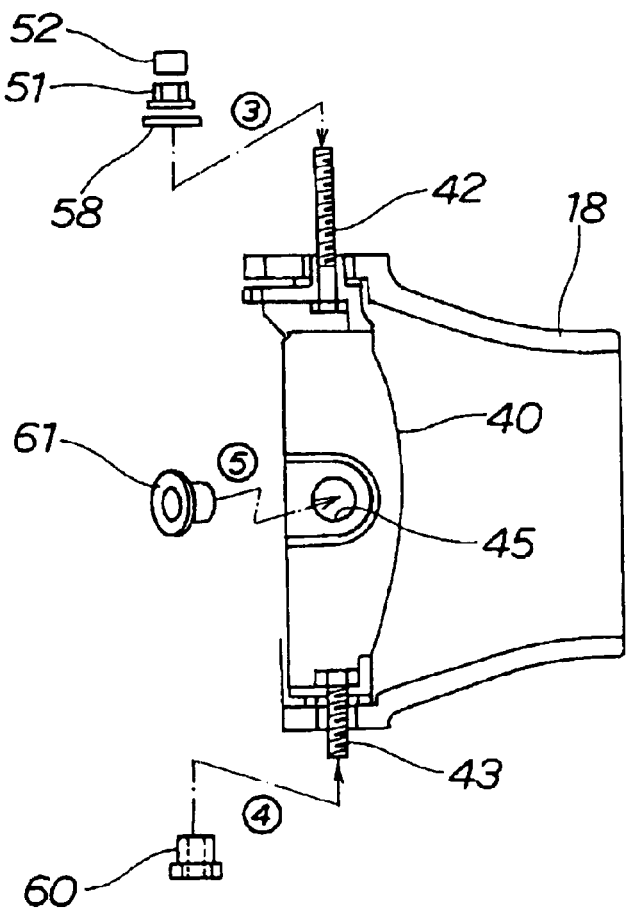

As shown in FIG. 10(b), the washer 58 is fitted over the upper bolt 42 protruding from the upper end of the steering nozzle 18 as indicated by arrow (3), and the nut 51 is screw-engaged from the upper side thereof. By this, the upper end of the trim ring 40 and the upper end of the steering nozzle 18 can be connected through the upper bolt 42. After the nut 51 is screw-engaged with the upper bolt 42, the spacer 52 is fitted over the upper bolt 42 protruding from the nut.

Next, the nut 60 is screw-engaged with the lower bolt 43 as indicated by arrow (4), whereby the lower end of the trim ring 40 and the lower end of the steering nozzle 18 can be connected through the lower bolt 43. By this, the trim ring 40 can be connected to the steering nozzle 18 with the upper bolt 42 and the lower bolt 43.

Subsequently, the collars 61, 61 are inserted into the left and right side mount holes 45, 45 (the side mount hole on this side is not shown) in the trim ring 40 from the inside of the trim ring 40 as indicated by arrow (5).

Figure 11A:
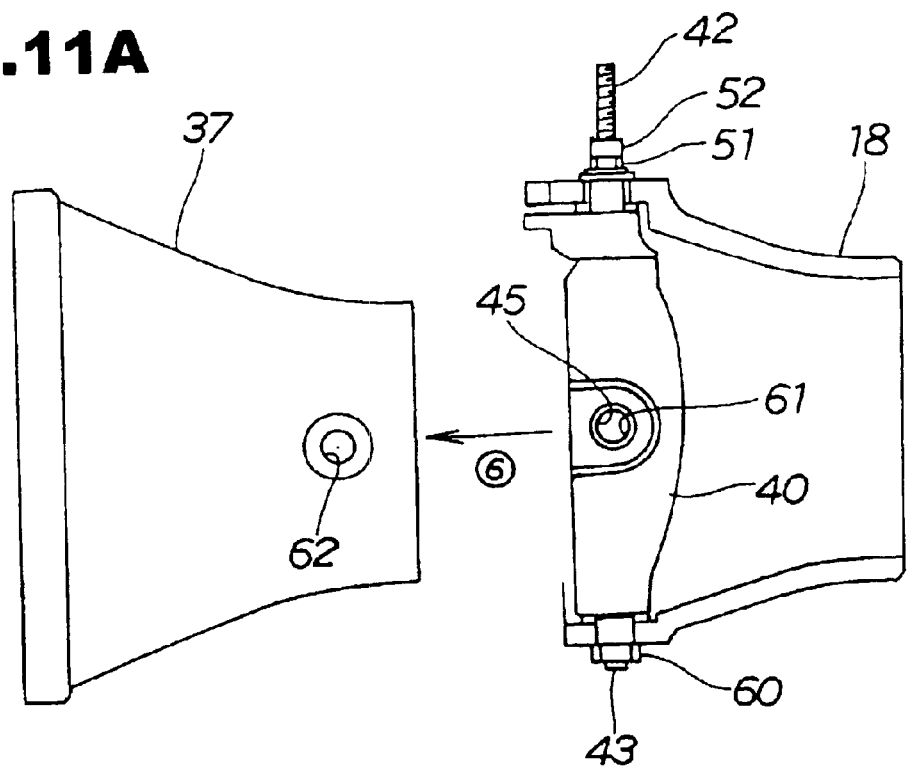
FIGS. 11(a) and 11(b) are additional assembly step views for illustrating the process of assembling the steering nozzle onto the jet nozzle, in the personal watercraft according to the present invention.

FIGS. 11(a) and (b) are third assembly step views for illustrating the process of assembling the steering nozzle onto the jet nozzle, in the personal watercraft according to the present invention.

As shown in FIG. 11(a), in the condition where the trim ring 40 is connected to the steering nozzle 18 through the upper bolt 42 and the lower bolt 43, the trim ring 40 is fitted over the rear end of the jet nozzle 37 as indicated by arrow (6).

Figure 11B:
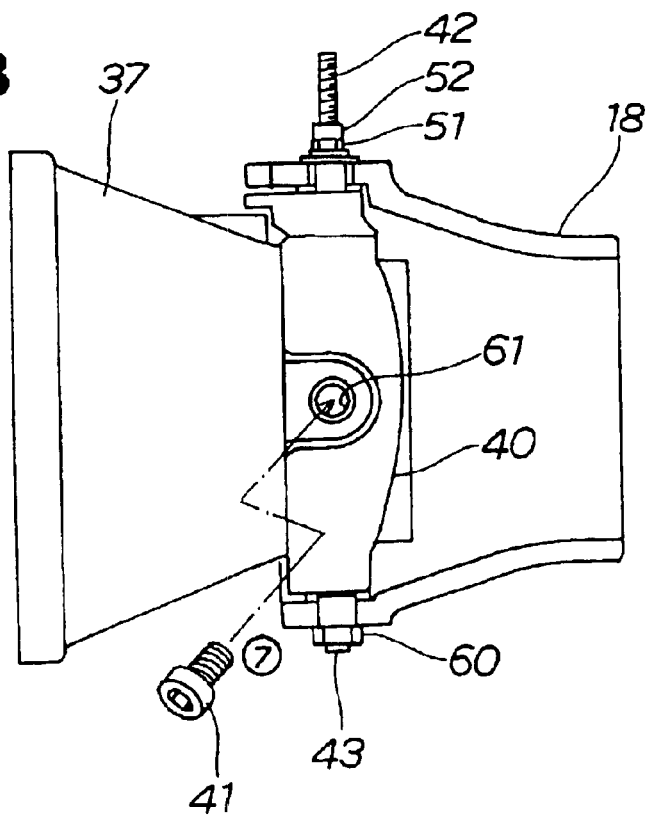

As shown in FIG. 11(b), the left and right bolts 41, 41 are inserted respectively into the left and right collars 61, 61 as indicated by arrow (7).

Figure 12A:
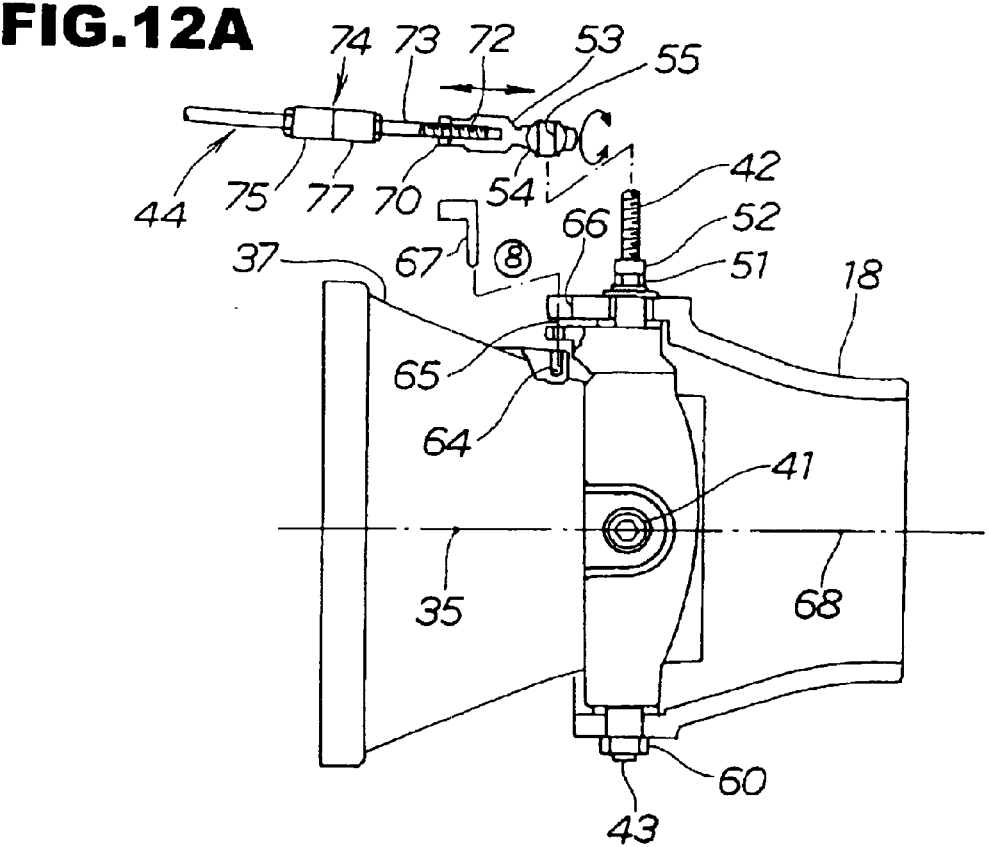
FIGS. 12(a) and 12(b) are additional assembly step views for illustrating the process of assembling the steering nozzle onto the jet nozzle, in the personal watercraft according to the present invention.

FIGS. 12(a) and (b) are fourth assembly step views for illustrating the process of assembling the steering nozzle onto the jet nozzle, in the personal watercraft according to the present invention.

As shown in FIG. 12(a), the positioning pin 67 is inserted through the insertion groove 66 into the positioning hole 65, and the tip end of the positioning pin 67 protruding from the positioning hole 65 is inserted into the positioning recessed portion 64. By this, the axis 68 of the steering nozzle 18 can be made to coincide with the axis of the jet nozzle 37, namely, with the axis 35 of the water jet propeller 17, and the direction of the steering nozzle 18 can be fixed in a standard position.

Thus, by the simple operation of just inserting the positioning pin 67 into the positioning hole 65 and the positioning recessed portion 64, the direction of the steering nozzle 18 can be fixed in the standard position. Therefore, the direction of the steering nozzle 18 can be adjusted to a normal angle in a laborsaving manner.

After the direction of the steering nozzle 18 is fixed into the standard position by inserting the positioning pin 67 into the positioning hole 65 and the positioning recessed portion 64, the trim joint 53 is fitted over the upper bolt 42. In this case, even if the length of the trim operating cable 44 has been adjusted in advance, it is necessary to readjust the cable length.

In performing the readjustment, the trim joint 53 once fitted over the upper bolt 42 is drawn out from the upper bolt 42, and is rotated as indicated by an arrow to thereby adjust the protrusion amount of the trim joint 53. By this, the length of the trim operating cable 44 can be adjusted.

Here, when the length of the trim operating cable 44 is adjusted by rotating the trim joint 53, for example, the mount hole 55 in the ball 54 of the trim joint 53 may come out of registration with the axis of the upper bolt 42. In this case, the trim joint 53 can be rotated arbitrarily by use of the joint means 74 intermediately provided at an intermediate portion of the rod portion 73. Namely, by rotating the rear joint portion 77 of the joint means 74, the mount hole 55 in the ball 54 can be easily adjusted to the axis of the upper bolt 42.

Figure 12B:
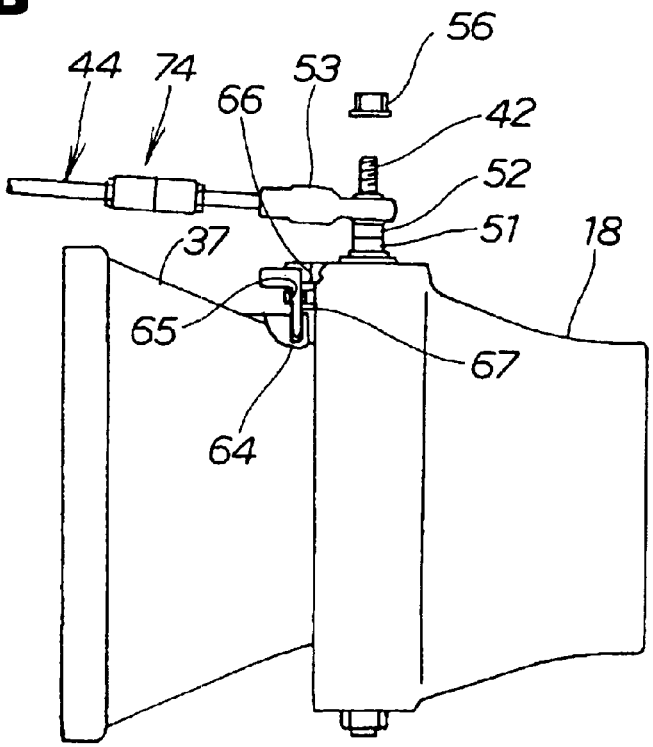

As shown in FIG. 12(b), after the length of the trim operating cable 44 is adjusted, the trim joint 53 is fitted over the upper bolt 42. Next, the nut 56 is screw-engaged with the upper bolt 42 projecting upwards from the trim joint 53, whereby the trim joint 53 is fixed to the upper bolt 42. By this, the adjustment of the length of the trim operating cable 44 is completed.

After the adjustment of the length of the trim operating cable 44 is completed, the positioning pin 67 is drawn out of the positioning hole 65 and the positioning recessed portion 64, thereby completing the process of assembling the steering nozzle 18.

Figure 13:
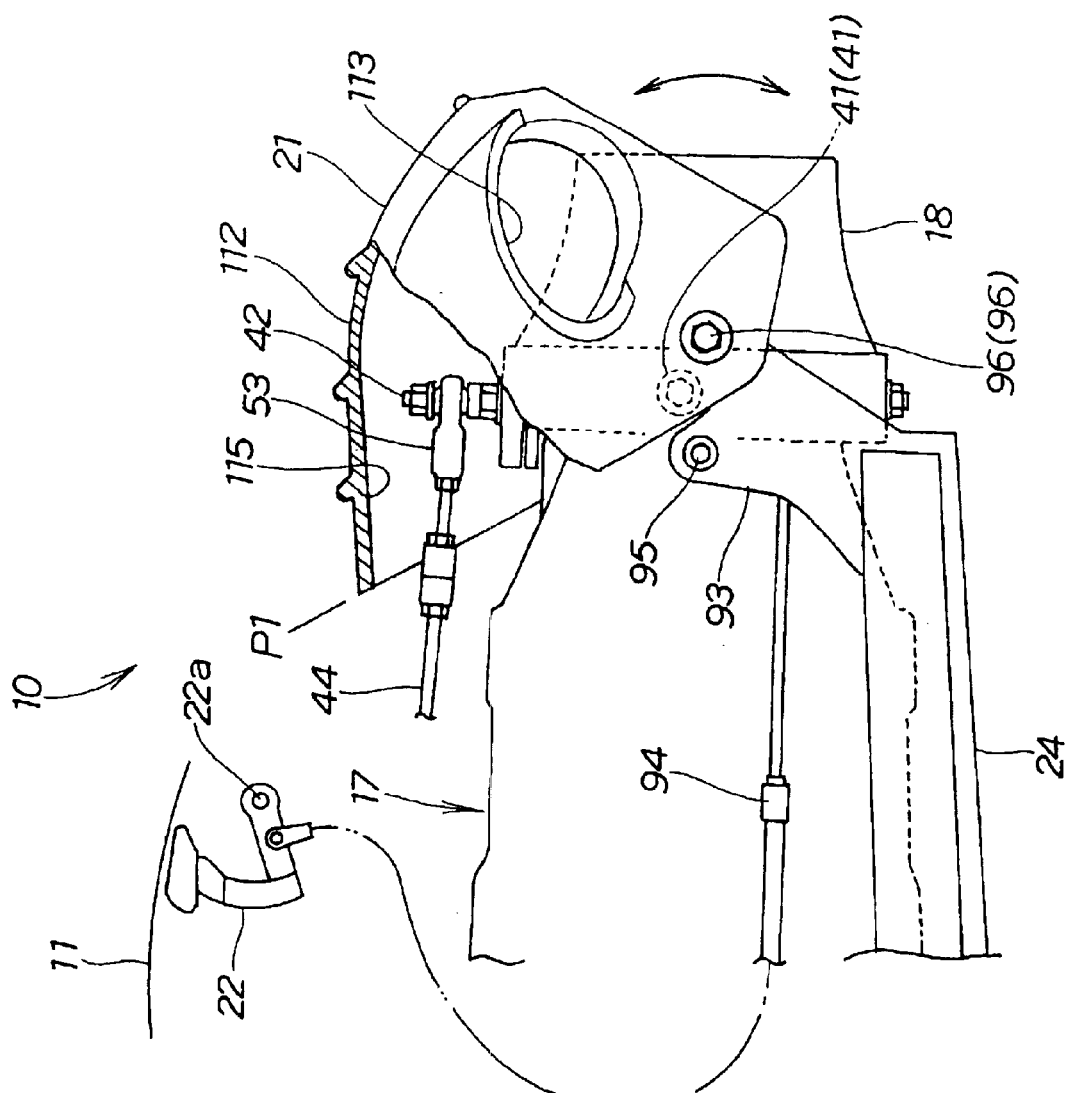
FIG. 13 shows the relationship between an upper bolt, a trim operating cable and a reverse bucket, in the personal watercraft according to the present invention.

FIG. 13 illustrates the relationship between the upper bolt and the trim operating cable and the reverse bucket, in the personal watercraft according to the present invention. By pressing back the reverse operating lever 22 downward from the condition shown in FIG. 6, with the support shaft 22a as a center, the reverse bucket 21 is raised from the reverse position P2 to the forward position P1.

Here, the personal watercraft 10 has a structure in which the steering nozzle 18 is vertically swung as indicated by arrows, with the left and right bolts 41, 41 as an axis. For this reason, the upper bolt 42 is attached to an upper end portion of the steering nozzle 18, and the trim operating cable 44 is attached to the upper bolt 42 through the trim joint 53 and disposed along an upper portion of the stator 31.

Therefore, at the time of raising the reverse bucket 21 to the forward position P1, the rear wall 112 of the reverse bucket 21 may interfere with these members (the upper bolt 42, the trim joint 53 and the trim operating cable 44).

Taking this into account, as discussed in detail above, the rear wall 112 of the reverse bucket 21 is provided with the connection portion containing recessed portion 115 for obviating the interference with these members (the upper bolt 42, the trim joint 53 and the trim operating cable 44).

Accordingly, the rear wall 112 of the reverse bucket 21 can be prevented from interfering with the upper bolt 42 or the trim joint 53 when the reverse bucket 21 is raised to the forward position P1.

Figure 14A:
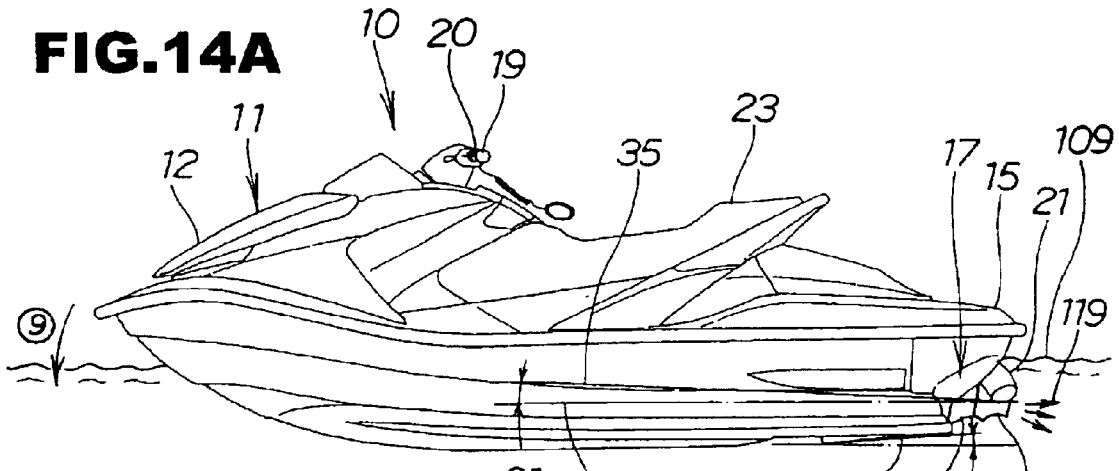
FIGS. 14(a), 14(b), and 14(c) show the propulsion condition of the personal watercraft according to the present invention.
Figure 14B:
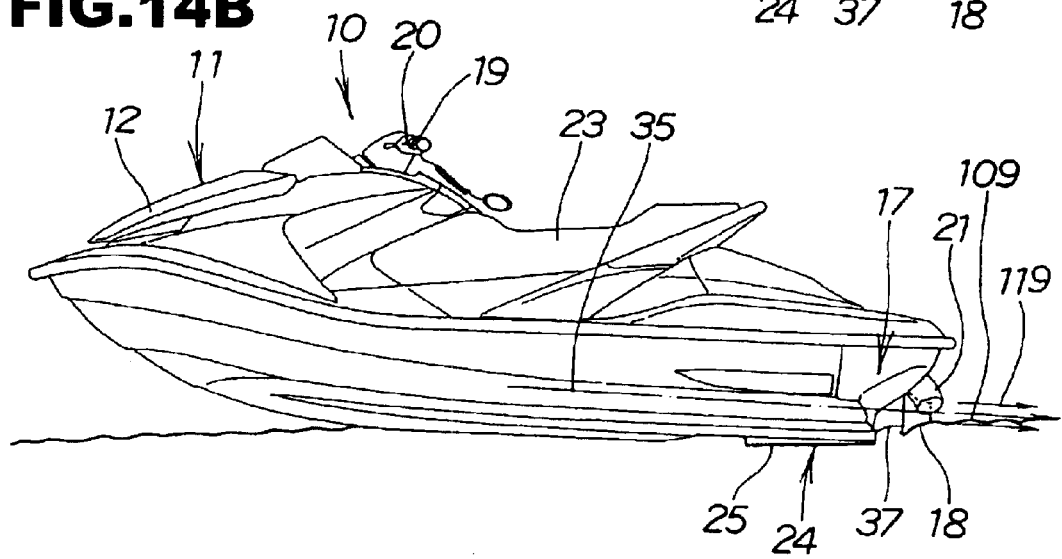
Figure 14C:
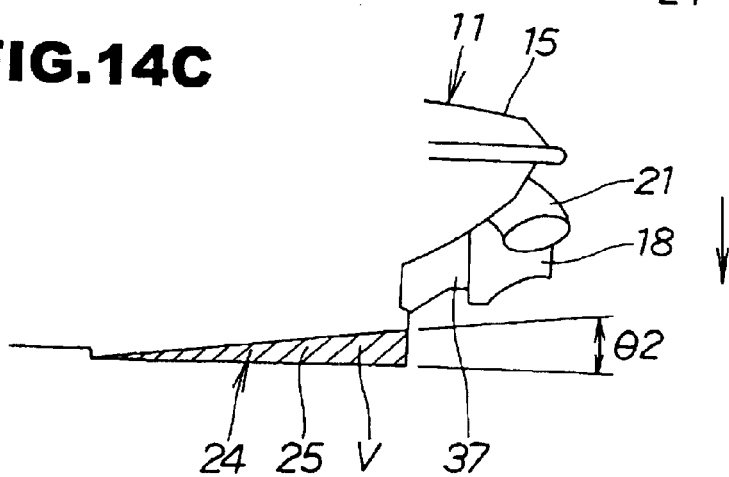

FIGS. 14(a) to (c) illustrate the propulsion condition of the personal watercraft according to the present invention. Generally, a personal watercraft has the tendency that a front portion 12 of the hull 11 is floated up at the time of starting. Therefore, it is desired to provide a personal watercraft 10 which can be started favorably without the floating-up of the front portion 12 (namely, the bow) of the hull 11.

In view of this, the axis 35 of the water jet propeller 17 has been set with a downward gradient at an angle θ1 toward the rear side of the hull 11, relative to the reference line 36 parallel to the horizontal line during planing. By this, the effect as shown in FIG. 14(a) is obtained.

In FIG. 14(a), at the time of starting the personal watercraft 10, the trim operating lever 20 (see FIG. 1 also) is gripped, to thereby turn the steering nozzle 18 downwards relative to the axis 35 of the water jet propeller 17. By this, jet water 119 is jetted from the steering nozzle 18 downwards relative to the surface of water 109.

As a result, a force for floating up the stem 15 of the hull 11 is generated, which tends to lower the front portion 12 of the hull 11 as indicated by arrow (9). Therefore, at the time of starting the personal watercraft 10, the personal watercraft 10 can be started favorably without the floating-up of the front portion 12 of the hull 11.

In FIG. 14(b), with the jet force of jet water 119 increased, the personal watercraft 10 is put into a planing condition. With the personal watercraft 10 put into the planing condition, the front portion 12 of the hull 11 parts from the surface of water and the floating-up tendency is lost; therefore, the grip on the trim operating lever 20 (see FIG. 1 also) is released, thereby setting the steering nozzle 18 to be coaxial with the axis 35 of the water jet propeller 17. By this, the force for floating up the stern 15 of the hull 11 can be reduced.

Here, as shown in FIG. 14(c), the personal watercraft 10 has a structure in which the bottom surface 25 of the ride plate 24 is set with the upward gradient at the angle θ2 toward the rear side of the hull 11, relative to the reference line 36 parallel to the horizontal line during planing, as shown in FIG. 14(a). With the bottom surface 25 of the ride plate 24 set with the upward gradient at the angle θ2, the volume (the hatched portion) V can be reduced, as compared with the conventional ride plate. Accordingly, the buoyancy corresponding to the volume V can be reduced.

Therefore, the buoyancy on the stern 15 of the hull 11 can be reduced as compared with the buoyancy in the case of an ordinary hull, so that the stern 15 will sink more easily in the direction of the arrow.

Returning to FIG. 14(b), with the jet force of jet water 119 increased to put the personal watercraft 10 into the planing condition, the velocity of the personal watercraft 10 is increased, and the hull 11 tends to float up from the surface of water 109.

In this instance, the steering nozzle 18 coincides with the axis 35 of the water jet propeller 17 and has the downward gradient at the inclination angle θ1 relative to the horizontal line 36 (see FIG. 2). Therefore, a force for raising the stern 15 is generated.

Here, by setting the bottom surface 25 of the ride plate 24 with the upward gradient at the angle θ2, the stern 15 is made to be easier to lower. As a result, the front and rear portions of the hull 11 are favorably floated up from the surface of water 109, and the personal watercraft 10 can plane in a favorable posture.

The inclination angle θ1 of the axis 35 of the water jet propeller 17 and the inclination angle θ2 of the bottom surface 25 of the ride plate 24 described in the above embodiment can be appropriately set according to the personal watercraft.

The present invention, as described above, displays the following effects. The axis of the jet propeller is set with a rearwardly downward gradient, and the jet direction of jet water ejected from the steering nozzle coincides with the axis of the jet propeller. Therefore, the flow passage resistance of the steering nozzle can be reduced, the jet water can be ejected efficiently, and the propulsion force can be enhanced.

In addition, with the bottom surface of the stern set with a rearwardly upward gradient, the volume of the bottom surface can be reduced as compared with an ordinary stern bottom surface, and the buoyancy can be reduced by an amount corresponding to the volume reduced. Therefore, the buoyancy on the stern can be reduced as compared with the buoyancy on an ordinary stern, so that it is easier for the stern to sink underwater.

Therefore, when the jet force of the jet water is increased to put the personal watercraft into the planing condition, a force for lifting the stern upwards is generated because the jet direction of the jet water is downwards, but, since the bottom surface of the stern is set with the rearwardly upward gradient, front and rear portions of the hull can be favorably floated up from the surface of water, and the personal watercraft can plane in a favorable posture. By this, the resistance derived from the water surface exerted on the personal watercraft can be reduced when the personal watercraft planes.

In addition, the steering nozzle is vertically swingable, whereby the jet direction of the jet water can be appropriately adjusted in the vertical direction during planing of the personal watercraft, so that the hull can be maintained in a favorable planing posture.

The jet direction of the jet water ejected from the steering nozzle has been set to coincide with the axis of the jet propeller at the standard position during navigation. Therefore, with the standard position set to be a position during navigation or planing of the personal watercraft and with the steering nozzle set free at the time of navigation or planing, the force of jet water ejected by the jet propeller returns the steering nozzle into the standard position, so that the need for a member for maintaining the steering nozzle in the standard position can be eliminated. By this, the structure for vertically swinging the steering nozzle can be simplified.

The present invention should not be considered limited to the particular examples or materials described above, but rather should be understood to cover all aspect of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A personal watercraft comprising:
an engine disposed on a lower side of a deck of a hull;
a jet propeller disposed on a rear side of the engine;
a jet nozzle that ejects jet water, the jet nozzle disposed on a rear side of the jet propeller;
a steering nozzle supported on the jet nozzle so as to be movable in a left-right direction for determining a jet direction of jet water ejected from the jet nozzle; and
a ride plate, the ride plate being set at an angle relative to a reference line, the reference line being parallel to a horizontal line of the watercraft during planning, such that the ride plate forms an upward gradient toward the rear side of the hull,
wherein the axis of the jet propeller is set with a rearwardly downward gradient, and the jet direction of jet water ejected from the steering nozzle coincides with the axis of the jet propeller.

2. The personal watercraft according to claim 1, wherein if the steering nozzle is set free relative to the jet nozzle, the axis of the jet propeller and the axis of the steering nozzle are caused to coincide by a jet force resulting from ejected jet water.

3. The personal watercraft according to claim 1, wherein the steering nozzle is vertically movable and the jet direction of jet water ejected from the steering nozzle coincides with the axis of the jet propeller at a standard position during navigation.

4. A personal watercraft comprising:
jet propulsion means for propelling the watercraft forward;
nozzle means for ejecting jet water from a rear side of the jet propulsion means;
steering means supported on the nozzle means so as to be movable in a left-right direction for determining a jet direction of jet water ejected from the jet nozzle; and
a ride plate, the ride plate being set at an angle relative to a reference line, the reference line being parallel to a horizontal line of the watercraft during planning, such that the ride plate forms an upward gradient toward the rear side of the hull,
wherein an axis of the jet propulsion means is set with a rearwardly downward gradient, the jet direction of jet water ejected from the steering means coincides with the axis of the jet propulsion means, and a bottom surface of a stern of the watercraft has a rearwardly upward gradient.

5. The personal watercraft according to claim 4, wherein if the steering means nozzle is set free relative to the nozzle means, the axis of the jet propeller and the axis of the steering nozzle are caused to coincide by a jet force resulting from ejected jet water.

6. The personal watercraft according to claim 4, wherein the nozzle is vertically movable and the jet direction of jet water ejected from the nozzle means coincides with the axis of the jet propeller at a standard position during navigation.

7. A method of manufacturing a watercraft that comprises an engine, a jet propeller, a jet nozzle for ejecting jet water, and a steering nozzle,
the method comprising the steps of:
providing a ride plate at an angle relative to a reference line, the reference line being parallel to a horizontal line of the watercraft during planning, such that the ride plate forms an upward gradient toward the rear side of the hull, and
fixing an axis of the jet propeller to coincide with an axis of the steering nozzle in a standard position during navigation of the watercraft, wherein the standard position is set so that the coinciding axes have a rearwardly downward gradient.

* * * * *